Aug. 31, 1965 C. F. MARSCHNER 3,203,300
UNIVERSAL GRIP LOCKBOLT
Filed Oct. 3, 1961 2 Sheets-Sheet 2
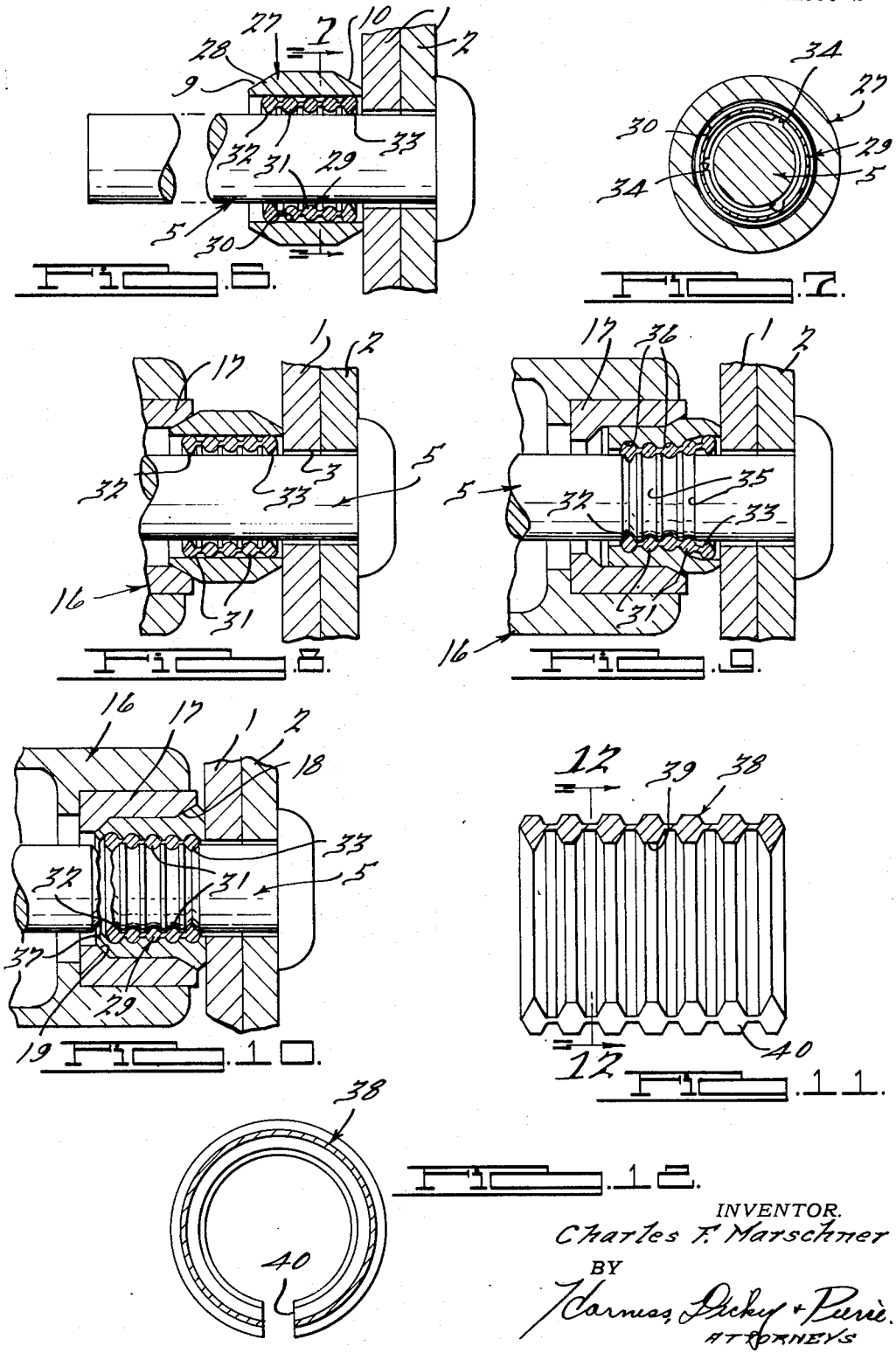
INVENTOR.
Charles F. Marschner
BY
Harness, Dickey & Pierce
ATTORNEYS

United States Patent Office 3,203,300
Patented Aug. 31, 1965

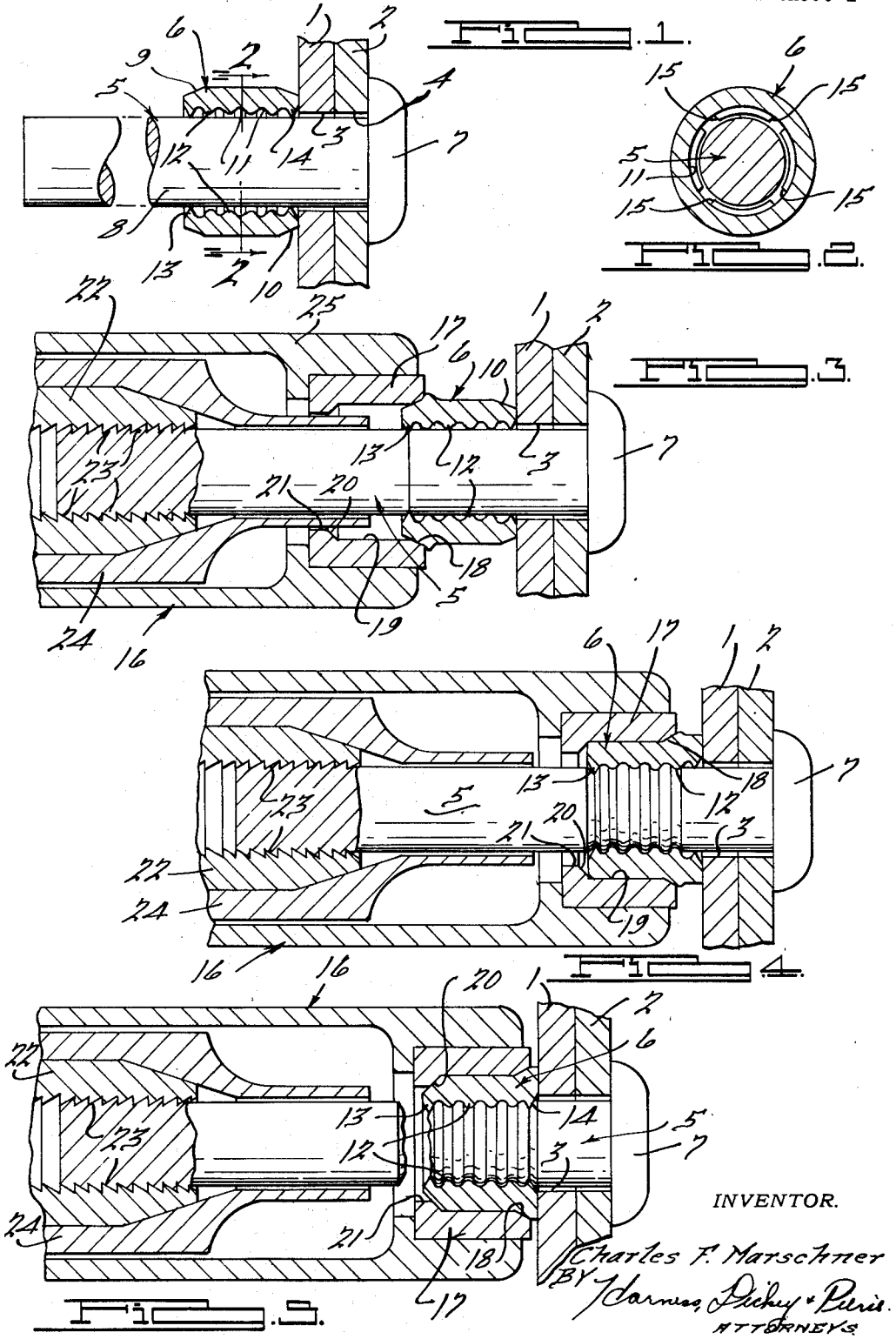

3,203,300
UNIVERSAL GRIP LOCKBOLT
Charles F. Marschner, Grosse Pointe Woods, Mich., assignor to Huck Manufacturing Company, Detroit, Mich., a corporation of Michigan
Filed Oct. 3, 1961, Ser. No. 142,659
7 Claims. (Cl. 85—7)

The present invention relates to fastening devices known as lockbolts.

Lockbolts are two-part fasteners comprising a pin and collar in which the pin is inserted through openings from one side of the work, the collar is disposed over the projecting end of the pin from the opposite side of the work, and the pin and collar are swaged together through the action of cooperating driving tool which pulls the pin and applies a reaction force against the collar to pull the work together, swage the collar and pin together and break the projecting end of the pin. In prior lockbolts of one type such as those disclosed in Huck Patents 2,531,048 and 2,531,049 the pin is preformed with a head at one end and pull means at the opposite end. Such pull means are in the form of a plurality of longitudinally spaced annular projections and recesses which are adapted to be engaged by a cooperating pull member in the pull gun. Locking means are provided intermediate the head and the pull means and such locking means are in the form of annular projections and recesses providing locking grooves. A breakneck of reduced diameter is preformed in the pin between the locking grooves and pull means, and the pin tail breaks off at the breakneck when the fastener is finally set. Lockbolts are provided in a wide range of diameters and to cover a wide range of thicknesses of sheets or members to be secured together, known as "grip;" and, where the locking grooves are preformed in the pin, such pin can only be used for a limited grip range. Standard types of lockbolts have incremental grip ranges, usually $\frac{1}{16}$ of an inch under present commercial practice. This means that such lockbolts can be used to qoin two or more sheets of material whose combined thickness falls within the prescribed grip range. A smooth shank portion is provided on the pin between the pin head and the locking grooves and the length of this smooth section of the pin must be different for different grip fasteners. This means that a tremendous inventory of fasteners having different grip lengths must be kept to satisfy the many differences in sheet thickness combinations found in the many fields in which these fasteners are used.

According to the present invention a fastener of a different lockbolt type is provided which for a given diameter can cover all of the grip ranges so that the inventory may be considerably reduced, both by the manufacturer and the user, and thus resulting in effective savings to both.

The pin of the present invention has a smooth periphery throughout its lengths of substantial uniformity with the usual preformed head at one end. Thus the preformed locking grooves, preformed breakneck and preformed pull grooves are eliminated.

The collar is preformed with means which form the locking grooves and the breakneck on the pin simultaneously with the swaging of the collar.

The preformed pull grooves, locking grooves and breakneck on the prior pins are formed by rolling dies which have a cross-sectional configuration complementary to the cross-sectional configurations of the preformed locking grooves and breakneck in the prior pins.

The collars of the present invention have hardened portions on the interior which substantially conform to the cross-sectional configurations of the locking groove and breakneck forming portions of the rolling dies so that as the collar is swaged the hardened portions are impressed into the pin automatically and simultaneously forming the locking grooves in the pin and securing the collar and pin together. In one embodiment of the present invention the harder inner portion of the collar is formed integral with the collar and in another embodiment the harder inner portion is in the form of a separate ring. The separate ring is of such configuration that it has inwardly and outwardly projecting portions so that as the collar is swaged the inner portions are pressed into the pin and the outer portions are impressed into the softer collar portion to thus provide an interlock between the collar and the pin.

The hardened portions are also provided with inwardly preformed breaknecks in the prior pins and thus auto- the locking portions so that a deeper impression is made in the pin, such deeper impression conforming to the performed breaknecks in the prior pins and thus automatically forming the breakneck. This will also assure the breakneck being within the collar, or substantially flush thereto, so that a jagged pin end does not project beyond the end of the collar.

It is preferred that the collars be reversible and under these circumstances these portions that project farther inwardly to project the breakneck would be formed on both ends of the collar. The swaging anvil of the driving tool would then be of such a configuration to assure that the longer inward projection adjacent the work would not be impressed into the pin any further than the adjacent locking projections and that the outermost projection would be impressed into the pin farther than all other projections to assure proper location of the breakneck and thus proper functioning of the fastener.

The driving tool is also provided with sharp teeth on the gripping jaws of the driving tool and such sharp jaws will bite into the pin in order to grip and pull the pin without the necessity of preformed pull grooves.

The primary object of the present invention is to provide an improved lockbolt which can be used for all grips so that within diameter categories one fastener will take the place of many prior fasteners. This results in considerable savings due to inventory reduction.

Other objects of the invention will become apparent from the following specification, the drawings relating thereto and the claims hereinafter set forth.

In referring to the drawings:

FIGURE 1 is a longitudinal and cross-sectional view of the fastener illustrating one embodiment of the present invention;

FIG. 2 is a cross-sectional view taken substantially along the line 2—2 of FIG. 1;

FIG. 3 is a view similar to FIG. 1 showing a portion of the driving tool and showing the fastener in an intermediate state of its setting;

FIG. 4 is a view similar to FIG. 3 showing the fastener in a further stage of setting;

FIG. 5 is a view similar to FIGS. 3 and 4 showing the fastener as finally set with the pin broken at the breakneck and before the anvil has been removed.

FIG. 6 is a view similar to FIG. 1 illustrating a modified form of the present invention;

FIG. 7 is a cross-sectional view taken substantially along the line 7—7 of FIG. 6;

FIGS. 8, 9 and 10 are views similar to FIG. 7 but showing a part of the nose assembly of the driving tool applied and showing the fastener in various stages of setting;

FIG. 11 is a cross-sectional view of a modified form of ring;

FIG. 12 is a cross-sectional view taken substantially along the line 12—12 of FIG. 11.

Referring to the drawings and referring particularly to FIGS. 1 through 5 thereof, one embodiment of the present invention is illustrated. Sheets 1 and 2 have openings 3 and 4 therethrough, which are substantially aligned, and the sheets 1 and 2 are adapted to be secured together. Such sheets may be initially separated and if so, they will be pulled tightly together during the setting of the fastener.

The fastener of the present invention comprises a pin generally indicated at 5 and a collar generally indicated at 6. The pin 5 has a preformed head 7 at one end and has a stem 8 which is circular in cross-section and which is smooth on its circumference throughout its length. The pin is positioned in the openings 3 and 4 in the sheets or panels 1 and 2 with the head 7 abutting against its adjacent sheet and with the stem 8 projecting beyond the opposite side of the other sheet.

The collar 6 is generally tubular in form and has a cylindrical opening therethrough which is slightly larger than the outer diameter of the pin. The collar 6 is positioned over the pin and against the adjacent sheet 1.

In the embodiment illustrated the collar 6 is reversible, that is it is symmetrical, having both ends the same so that it may be disposed on the pin in either direction. In this particular embodiment, which is shown for illustration purposes only, the collar 6 is provided with annular tapers 9 and 10 at its opposite ends which are symmetrical and which provide the hold-off shoulder for a purpose that will be hereinafter described.

The collar 6 is formed of a relatively soft metal and has an inner portion in the form of a plurality of circumferentially extending grooves 11 and intermediate ribs or projections 12 which are relatively blunt. The annular end ribs 13 and 14 are the same and project inwardly farther than the ribs 12 and terminate in relatively sharper edges. The inner portion, including the ribs 12, 13 and 14, has a portion of the metal in the collar immediately adjacent the outer portion hardened so as to provide an inner portion which is progressively harder from the inside to the outer portion which is relatively soft. The inner portion of the collar is also harder than the metal of the shank 6.

Metal in the projections 12, 13 and 14 is removed along the length of the collar at circumferentially spaced points as shown at 15 in FIG. 2 for a purpose that will be hereinafter explained. There are four of such relief portions as illustrated in FIG. 2, but it is to be understood that this number may be varied and the sizes and positions of such relief portions may be changed within the scope of the present invention.

A driving tool generally indicated at 16 is provided and only a portion of such driving tool is shown, as such tools in general are well known in the art. That portion of the tool 16 that is shown is known as the nose and such part is changed in the present invention in details and for purposes that will hereinafter be pointed out. The driving tool comprises an anvil 17 having an annular frustoconical end portion 18 which is substantially complementary to the shoulders 9 and 10 on the sleeve 6. The anvil then has a cylindrical bore 19 which terminates in an annular tapered shoulder 20, the shoulder 20 terminating in a cylindrical annular opening 21.

In order to grip the smooth stem 8, jaws 22 are provided which terminate in inwardly and backwardly projecting annular pointed gripping jaws 23. There are a plurality of such gripping jaws 23 in order to assure an adequate grip on the stem and the jaws 23 are formed of a metal harder than the metal of the stem 8 so as to assure a biting into the stem 8 in the pulling of the pin. The jaws 22 are constructed to be contracted and moved radially and inwardly by a jaw contracting and moving sleeve element 24. When the jaws 22 and the member 24 move to the left (viewing FIG. 3) to pull the pin, the reaction to any pull is applied through a barrel or sleeve 25 and then through the anvil 17, which is mounted in the sleeve 25.

When the tool 16 is applied to the fastener as shown in FIG. 3 the anvil shoulder 18 abuts against the adjacent hold-off taper 9 on the sleeve 6. The purpose of the hold-off taper 9 is to prevent premature swaging of the collar, that is movement of the collar into engagement with the pin until the plates have been pulled together, if separated, and to assure a proper sequence of setting of the fastener. The jaws 22, during this initial stage, are caused to move radially inwardly and the sharp edges 23 will bite into the surface of the pin to form the pull grooves. In the embodiment illustrated, the edges 23 are illustrated as being annular projections but they can, if desired, be in the form of screw threads, in other words, helical in form.

As the pulling on the pin progresses, the anvil 17 will ride up over the collar 6 initially causing the projection 13 to bite into the surface of the pin and as the pulling continues the anvil moves to the right, viewing FIGS. 3, 4 and 5, over the collar and causing the collar to be swaged radially, inwardly onto the pin so that the projections 12 progressively are impressed into the periphery of the pin causing the metal to flow into the grooves 11 and thus progressively forming the locking grooves in the pin. FIG. 4 shows the operation just before the anvil has reached its limit of movement, and FIG. 5 shows the anvil at its limit of inward movement. It will thus be seen, as shown in FIG. 5, the taper 18 of the anvil causes the projection 14 to be moved inwardly but only substantially to the same extent as the intermediate projections 12. The rear tapered portion 20 engages the outer end of the collar and forces the projection 13 inwardly to a position further inwardly than the intermediate projections 12 and the opposite end projections 14, thus insuring the formation of a breakneck. As the force of the pull builds up, the pin will break at this weakened section as shown in FIG. 5. One of the advantages of this present invention is to assure that the breakneck will always be inside the outer end of the collar so that no roughened edges are projecting beyond the end of the collar.

While the collar 6 has been illustrated as a symmetrical or a reversible collar, the present invention is equally adapted for use with collars such as those shown in the Huck patents above mentioned. In that case only that end of the collar adjacent the hold-off taper would be provided with the annular breakneck forming projection 13 and the opposite projection would be formed symmetrically to the intermediate projections 12.

Also, if it is desired to employ a symmetrical collar of different configurations, the collar 6 could be formed with internal chamfers at the ends rather than the external tapers 9 and 10. The outer configuration of the collars does not constitute the important aspects of the present invention which are useful with different collar configurations.

As the collar 6 is swaged its external diameter is reduced which means that the hardened inner portion, including the projections 12, 13 and 14, are moved radially, inwardly into the stem of the pin. It will be appreciated that during this inward movement the circumference of the hardened inner portion is reduced; and, in order to accommodate this reduction in periphery, the reliefs 15 are provided to assure proper inner radial movement without any tendency of the inner harder portion to buckle. As stated above, the number and sizes of such reliefs may be varied.

Referring to FIGS. 6 to 10, a modified form of collar is generally illustrated at 27 and with the exception of modifications in the collar the function and operation is the same as that in FIGS. 1 to 5. The collar 27 is also generally tubular in form and comprises an outer portion 28 and an inner separate ring member 29. Again, the outer portion 28 may have different configurations as described above in connection with collar 6. It is shown here for purpose of illustration the same as that above, in that it is provided with the same hold-off shoulders 9 and 10. The collar 27 has a central opening 30 therethrough within which the ring 29 is received.

The ring 29 has a plurality of longitudinally spaced annular projection members 31 which in cross-section have blunt outer sections and blunt inner portions on the intermediate projections with the end projections 32 and 33 extending further inwardly than the intermediate projections, corresponding to projections 13 and 14 in the embodiment described above. The ring 29 may be disposed within the opening 30 in a press fit so that the inner and outer collar parts will not become separated in assembly.

The ring 29 is also provided with a plurality of longitudinally extending grooves 34 which remove metal in the ring and provide weakened sections therearound, in order to provide the same relation as at 15 in the embodiment above described, and to permit the circumferential contraction of the ring as the ring is forced radially inward. The grooves 34 are shown in the internal diameter, but could be on the outside diameter instead with the same functions.

The ring 29 is harder than the outer sleeve portion 28 and harder than the material of the pin 5 so that as the fastener is progerssively driven, as shown in FIGS. 8 to 10, the projections of the ring are forced into the surface of the pin to provide locking grooves 35 in the pin. The projections are likewise forced into the adjacent surface of the sleeve portion to provide complementary grooves 36 therein. When the fastener is finally set, the ring 29 thus serves to simultaneously form locking grooves in the pin and the adjacent collar portion to provide a positive interlock between the collar and the pin.

The relatively sharper projection 32 is forced farther inwardly than the other projections, as shown in FIG. 10, to form the breakneck and cause the pin to break at that location. Also, as shown in FIG. 10, it will be seen that the outer end of the collar, as indicated at 37, is forced around the outermost edge 29 so that the ring is firmly secured into position and will not be vibrated loose.

In FIGS. 11 and 12 a modified form of ring is illustrated at 38 which is similar to ring 39 except that the annual projections are flattened as indicated at 39, rather than being rounded as shown in ring 39. Also the relief in the ring 38 is provided by providing a single longitudinal split 40 which extends throughout the length of the ring 38 to accommodate the circumferential contraction of the ring 38 during setting. The modification shown in FIGS. 11 and 12 is to further illustrate that the configuration of the projections of the ring may be varied and the form of the relief may be varied without departing from the scope and substance of the present invention.

Changes may be made in the specific embodiments disclosed without departing from the spirit of the present invention, the scope of which is commensurate with the appended claims.

What is claimed is:

1. A swage type fastener comprising a metal pin and a pre-formed swageable metal collar having a circular opening therethrough, said pin including a performed head at one end and a solid stem having a smooth exterior extending therefrom, said head extending laterally beyond the stem to provide an abutment, said collar being generally tubular in form and being disposable on said stem, the outer portion of said collar being sufficiently relatively soft to be permanently deformed by a swaging tool and the inner portion being relatively harder than said outer portion of said collar and said pin, said inner and outer portions being substantially coextensive longitudinally thereof, said inner portion being in the form of longitudinally spaced inwardly projecting locking means defining said circular opening having a minimum diameter greater than the diameter of the stem so that the collar may be disposed thereon in embracing relation thereto, said locking means being adapted to be forced into said stem when said collar is swaged onto said stem to form complementary locking means in said stem.

2. A swage type fastener according to claim 1 in which portions through the locking means and through the surface of the inner portion are removed longitudinally thereof to provide relief in the inner portion to facilitate circumferential contraction of the inner portion during swaging.

3. A swage type fastener according to claim 1 in which said inner and outer portions are integral.

4. A swage type fastener according to claim 1 in which said inner and outer portions are separate unitary members.

5. A swage type fastener comprising a metal pin and a pre-formed swageable metal collar having a circular opening therethrough, said pin including a preformed head at one end and a solid stem having a smooth exterior, said collar being generally tubular in form and being disposable on said stem, the outer portion of said collar being sufficiently relatively soft to be permanently deformed by a swaging tool and having a substantially cylindrical opening therethrough and the inner portion being relatively harder than said outer portion of said collar and said pin, said inner and outer portions being separate and being substantially coextensive longitudinally thereof, said inner portion being generally cylindrical in form, said inner portion having longitudinally spaced radially inwardly and outwardly projecting locking means and adapted to be forced into said stem and into said outer portion respectively when said collar is swaged onto said stem to form complementary locking means in said stem and in said outer portion, said inwardly projecting locking means defining the minimum diameter which is greater than the diameter of the stem so that the collar may be disposed thereon in embracing relation thereto.

6. A swage type fastener according to claim 5 which also includes means providing relief in the inner ring portion to facilitate circumferential contraction of said inner portion during swaging.

7. A pre-formed swage type metal fastener collar adapted to embrace and be secured to a generally cylindrical fastener member, said collar being generally tubular in form and having a circular opening therethrough and comprising an outer portion and a separate unitary inner portion both of metal and both being substantially coextensive longitudinally, said outer portion being of a swageable metal of sufficient softness to be permanently deformable by a swaging tool, said inner portion being relatively harder than said outer portion and said pin and having a plurality of inwardly directed longitudinally spaced circuitous projections and a plurality of outwardly directed longitudinally spaced circuitous projections providing locking means formed therealong and adapted to be forced into said stem and into said outer portion respectively, portions through said inner portion including said inwardly and outwardly directed projection being removed longitudinally thereof to provide relief in the inner portion to facilitate circumferential contraction of the inner portion during swaging.

References Cited by the Examiner

UNITED STATES PATENTS

| 2,171,217 | 8/39 | Kreidel | 285—122 |
| 2,381,113 | 8/45 | Cook | 85—40 |
| 2,397,076 | 3/46 | Keller | 85—40 |
| 2,521,567 | 9/50 | Corrigan | 85—50 |
| 2,585,453 | 2/52 | Gallagher et al. | 285—382.7 |
| 2,955,505 | 10/60 | Schuster | 85—5 |
| 2,978,946 | 4/61 | Looker | 85—5 |
| 2,983,180 | 5/61 | Sygnator. | |

EDWARD C. ALLEN, *Primary Examiner.*

CARL W. TOMLIN, *Examiner.*

UNITED STATES PATENT OFFICE
CERTIFICATE OF CORRECTION

Patent No. 3,203,300                                            August 31, 1965

Charles F. Marschner

It is hereby certified that error appears in the above numbered patent requiring correction and that the said Letters Patent should read as corrected below.

Column 1, line 41, for "qoin" read -- join --; column 2, line 16, for "preformed breaknecks in the prior pins and thus auto-" read -- projecting portions which project farther inwardly than --.

Signed and sealed this 14th day of June 1966.

(SEAL)
Attest:

ERNEST W. SWIDER                            EDWARD J. BRENNER
Attesting Officer                                Commissioner of Patents